3,039,296
METHOD AND MEANS FOR INVESTIGATING STRUCTURES IN VIBRATION
Roger Maurice Destuynder, Noisy-Le-Sec, and Henri François Marie Loiseau, Fontenay-Aux-Roses, France, assignors to Office National d'Etudes et de Recherches Aeronautiques, Chatillon-sous-Bagneux, France, a corporation of France
Filed Mar. 27, 1957, Ser. No. 648,896
Claims priority, application France Mar. 28, 1956
18 Claims. (Cl. 73—67.2)

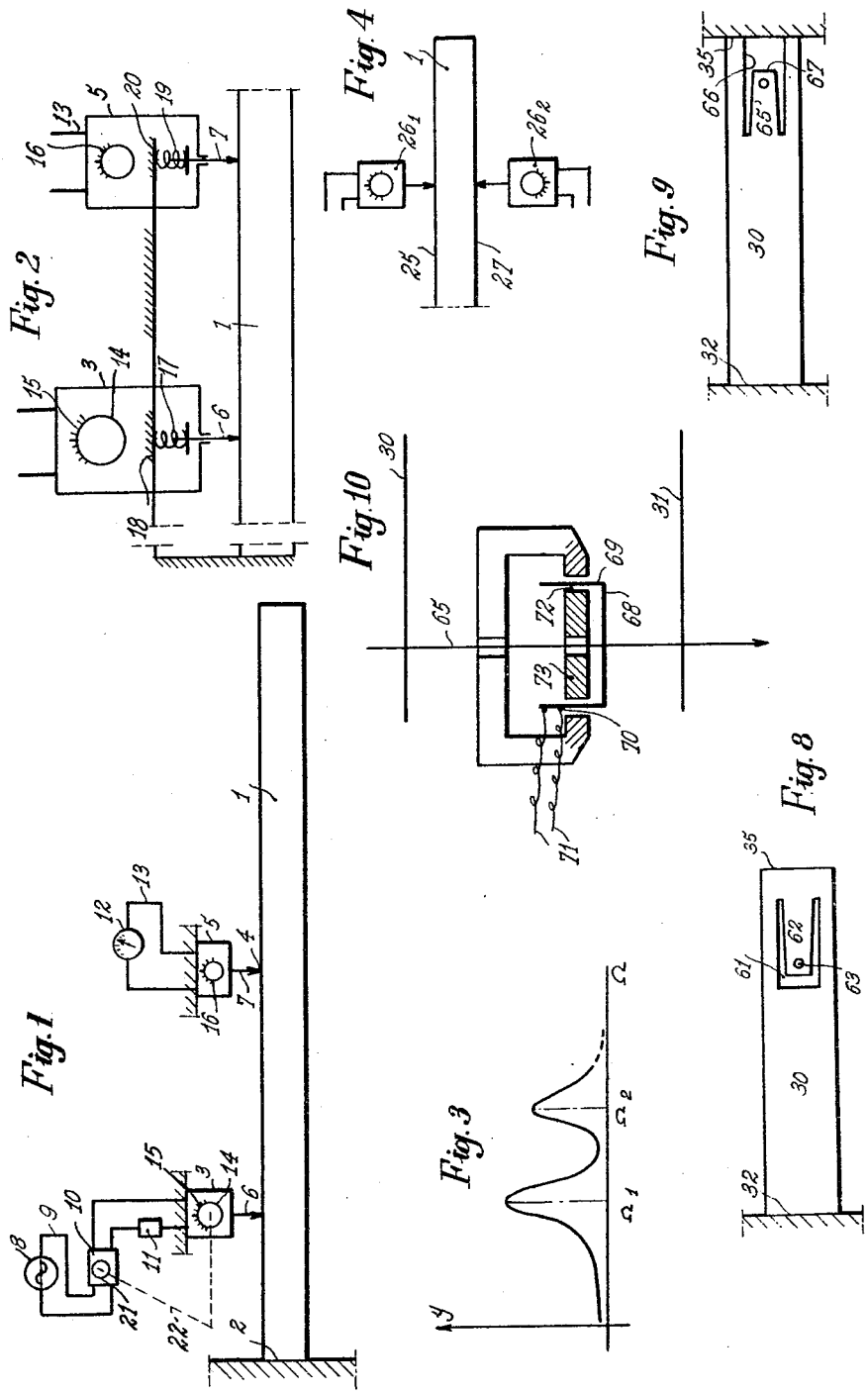

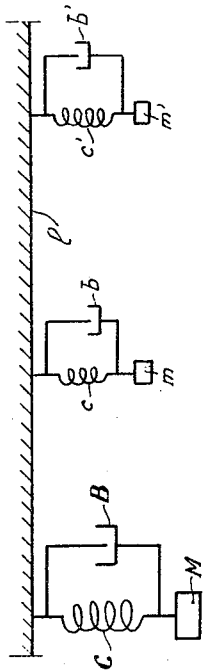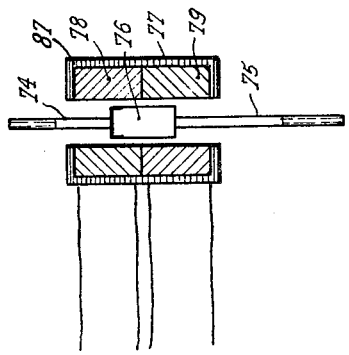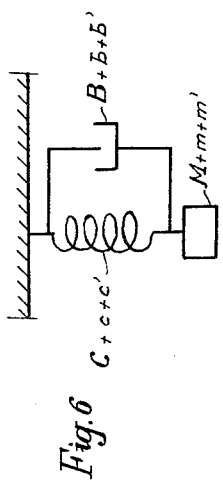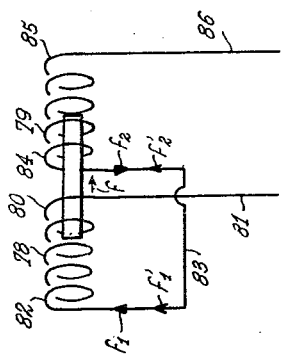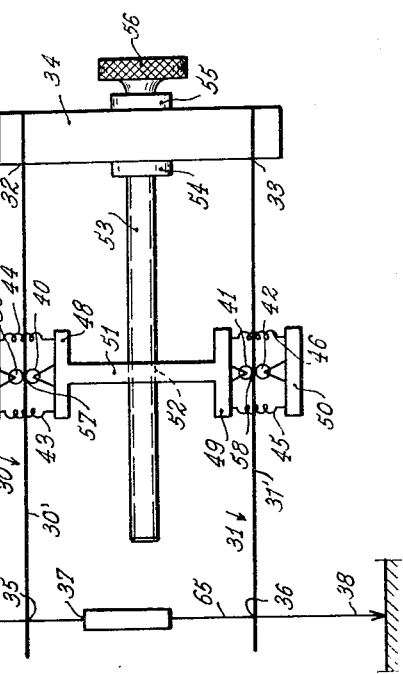

This invention relates to methods and means for investigating the behavior of structures under vibrational conditions.

A recent method of investigating structures under vibrational stress comprises subjecting the structure itself, or a reduced model or mockup of it, to controlled vibrations and measuring and analyzing the effects on the structure. A test setup for such a purpose must comprise means for vibrating or exciting the structure, and means, i.e. a vibration pick-off, for measuring the characteristics of deformation of the structure thus excited. Such systems while they have yielded useful results have inherent drawbacks. For one thing, adding a vibrator unit and a vibration pickoff to the structure to be tested yields, as a final result, an indication of the behavior under vibrational stress of a composite system including the structure, the vibrator and pickoff, rather than the actual behavior of the system to be tested. Erroneous indications result. Another drawback lies in the necessity of modifying the structure in order to attach the pickoff and/or exciter to it, the modifications usually involving drilling holes in the structure for bolts or similar attaching means, and this limits the number of tests to which the structure can be subjected without serious damage, and in any case requires comparatively long operations and impairs the strength and integrity of the structure.

It is therefore an object of this invention to provide a method whereby the attachment of an exciter and/or pickoff of the character described will not impair the accuracy of the vibration tests, and whereby the measured characteristics will be precisely those of the structure being tested itself and will hence make possible a reliable and accurate forecast of the behavior of the structure under vibrational stress in actual service.

Another object is to provide a method and means of the character specified which may be used without any modification of the structure tested and whereby measurements may be accomplished by simple mechanical contact between the structure and the exciter and pick-off, so that a large number of tests may be made in rapid succession and without any damage to the structure, e.g. by exciting and picking off vibrations at and from different points of the structure, thereby deriving a wealth of information from which reliable conclusions may be drawn.

According to the invention the structure is excited and/or tested by the use of exciter and/or pick-off units having adjustable resonant frequency, so that said frequency may be made equal or substantially equal to the resonant frequency of the structure.

The invention will thus make possible, as later described in detail, the use of iterative tests by a method of successive approximation, which quickly and surely lead to an accurate result.

The invention also includes devices for generating vibrations in a structure characterized by means therein for adjusting the resonant frequency of the device to any selected value within a frequency band.

Further included in the invention is a mechanical vibration receiver or pick-off comprising means for adjusting the resonant frequency of it to any selected value within a frequency band.

The invention comprises various specific embodiments of such devices possessing advantageous features to appear later.

The objects, features and advantages of the invention will be clearly understood from the ensuing exemplary description made with reference to the accompanying diagrammatic drawings wherein:

FIG. 1 illustrates a vibration test setup according to the invention;
FIG. 2 is a larger-scale view of part of the setup;
FIG. 3 is a frequency response graph;
FIG. 4 is a fragmentary view of a different test setup;
FIG. 5 illustrates a mechanical equivalent system;
FIG. 6 illustrates another equivalent system;
FIG. 7 is a simplified view of an exciter or pick-off device;
FIG. 8 is a plan view of a strip forming part of the device;
FIG. 9 is similar to FIG. 7 in a modified form of the invention;
FIG. 10 is a simplified view of one embodiment of a vibrating assembly for a vibration generator;
FIG. 11 similarly shows a vibrating assembly for a pick-off;
FIG. 12 is an electric circuit diagram of the winding means in FIG. 11.

As shown, FIG. 1 schematically illustrates a complete test setup according to the invention. The structure to be investigated is herein shown as a beam 1 with a fixed end 2. The beam is excited with vibrations from a vibration generator or exciter 3, and the motion of a point 4 of the beam is analyzed by means of a vibration receiver or pick-off 5. According to the invention, both the exciter 3 and pick-off 5 are free of any means for securing them to the beam 1 as by clamping, hooking engagement, bolting and so on. Instead, the coupling between the beam and the exciter, and the beam and the pickoff, is effected through a stylus or feeler element 6 and 7 respectively, in contact engagement with the beam surface, contact pressure being established by suitable spring means. In accordance with the invention, the exciter 3 and/or pickoff 5 include means for adjusting the resonant frequency thereof, which tuning means may desirably be made to act upon the means for establishing the contact pressure between the feeler 6 or 7 and the beam.

The vibration generator or exciter 3 is conventionally an electrodynamic device energized from a source of alternating energy 8 by way of a circuit 9 including means 10 for varying the frequency of the energizing voltage, and means 11 for varying the amplitude of the voltage. The pick-off device 5 is conventionally of an electromagnetic type, with a suitable indicator, such as a dial indicator 12, connected in the output circuit 13 of the pickoff 5. The means for tuning the resonant frequency of vibration generator 3 are operated from a tuning control 14 which rotates an index movable in front of a frequency scale 15. Similarly the means for adjusting the resonant frequency of pickoff 5 are operated from a tuning control knob 16 displacing an index in front of a frequency-vibrated scale.

In FIG. 2, the stylus or feeler 6 of exciter 3 is diagrammatically shown as biassed by spring means, conventionally indicated in the form of a helical spring 17 abutted against a fixed stop 18 and another stop carried by the feeler 6, and similarly the feeler 7 of the pick-off 5 is shown spring biassed by a spring 19 shown abutted against a fixed stop 20.

When energizing voltage is applied to the circuit 9, the vibration generator 3 excites vibrations in the beam 1 through the feeler 6. The beam in turn vibrates the feeler 7 of the pickoff 5 and induces corresponding voltage variations in the circuit 13 serving to derive measurements readable on the dial 12. Since both the feelers 6 and 7 are resiliently applied against the beam 1, the feelers are held substantially in contact with the beam, so that the dial 12 provides true information regarding the motion of the beam. In an initial test, the resonant frequencies of the vibratory system comprising generator 3, structure 1 and pick-off 5 may desirably be obtained by varying the frequency of the energizing voltage of the generator and determining the amplitude of the vibrations picked off by the pick-off 5. If a graph is then plotted for the amplitude $y$ as a function of the frequency $\Omega$, the resulting curve may typically be as shown in FIG. 3. In this example the curve indicates two resonant frequencies or pulsations, multiplied by the factor $2\pi$, $\Omega_1$ and $\Omega_2$. The tuning knobs 14 and 16 are then adjusted to tune the generator 3 and pick-off 5 so that the resonant frequency of each will be equal or approximately equal to one of the frequency values thus determined, for example $\Omega_1$. Another test is then carried out, in which the supply frequency to generator 3 is again varied. Another resonance curve is thus plotted which yields the resonant frequency value $\Omega'_1$. This frequency value as given by the system can then be considered as being very close to the resonant frequency of the structure 1. To perform the desired investigation, the exciter and pick-off are then adjusted so that they will have a resonant frequency equal to the frequency determined as above, and the exciter is supplied with energizing voltage at that frequency. In these circumstances, it is clear that the measurements obtained strictly apply to the structure under investigation considered per se, and that the presence both of the exciter and the pick-off do not interfere in any way, with the measurements. Inasmuch as both the exciter and pick-off are vibrating, so to speak, in unison with the structure, a dual result is obtained: first, the transfer of motion from the exciter to the structure and from the structure to the pick-off is effected in a perfectly successful manner by simple contact coupling, and, secondly, the exciter and pick-off do not oppose any resistance whatsoever to the inherent natural motion of the structure. Thereafter, a similar procedure may be repeated using the other resonant peak frequency $\Omega_2$.

In one embodiment of the invention, a mechanical coupling is provided between the tuning member 14 for adjusting the resonant frequency of the exciter and the tuning member 21 for the energizing frequency supplied to the exciter by the unit 10, such a mechanical connection being indicated diagrammatically at 22.

In cases where the spring pressure necessary to prevent the disengagement of the exciter feeler from the structure would be excessive, e.g., in that it would produce a static deformation of a flexible, lightweight structure under investigation, the invention contemplates applying an exciter $26_1$ on one side 25 of the structure and another similar exciter $26_2$ on the opposite side 27, and the alternating energy supplied to the two exciters being so phased that both exciter feelers are at all times moving in the same direction.

The structure, the vibration generator and the pick-off may be represented by a mechanical equivalent system as shown in FIG. 5. Thus the structure has a mass symbolically represented by the mass M, a stiffness symbolized by a spring C, and a damping coefficient represented by a damper B. Similar equivalent representations are used for the generator and the pick-off, with the corresponding components indicated by $m$, $b$, $c$ for the generator and $m'$, $b'$, $c'$ for the pick-off. All the components of all three systems are shown attached to a common reference support indicated at 1.

It will be recalled that the stiffness or rigidity (herein C, $c$ or $c'$) is defined as the ratio of the amplitude of any deformation to the force causing the said deformation; the damping coefficient, e.g. B, is defined by the formula $$B = \frac{\lambda}{2M\Omega}$$

wherein M is mass and $\Omega$ the $2\pi$ multiplied by the frequency (or pulsation) of applied vibrations and wherein $\lambda$ is given by the equation $$A_t = A e^{-\lambda t}$$

wherein $t$ is time, $e$ is the base of natural logarithms and $A_t$ the amplitude of the vibratory motion of an object initially vibrating with the amplitude A, after the sustaining vibrations are no longer applied to said object.

If the structure has a resonant frequency value $\Omega$, the equation of the vibratory motion of the structure when a force F is applied to it, is $$My'' + By' + Cy = F \cos \Omega t$$

wherein $y$ is the amplitude of displacement of the structure under the action of the force F and where $y'$ and $y''$ are the first and second derivatives of said displacement.

Since according to the invention the exciter is tuned to possess a resonant frequency value precisely equal to $\Omega$, the equation of motion will be $$my'' + by' + cy = \Delta F \cos \Omega t$$

where $\Delta F$ is the force required to displace the exciter system from its neutral position to the amplitude $y$ defined above.

Since the pick-off is likewise tuned to have a resonant frequency value equal to $\Omega$, its equation of motion is $$m'y'' + b'y' + c'y = \Delta F' \cos \Omega t$$

where $\Delta F'$ is the force required to displace the pick-off feeler from neutral to the amplitude $y$ defined above.

Adding the three equations above, $$(M+m+m')y'' + (B+b+b')y' + (C+c+c')y (F+\Delta F+\Delta F') \cos \Omega t$$

To state the same thing in other words, the resonant frequency value of the structure considered per se is $$\Omega = \sqrt{\frac{C}{M}}$$

The resonant frequency of the system comprising the structure, the exciter and pick-off is $$\Omega' = \sqrt{\frac{C+c+c'}{M+m+m'}}$$

Since the resonant frequencies of the pick-off and the exciter are both equal to the resonant frequency value of the structure, we have $$\frac{C}{M} = \frac{c}{m} = \frac{c'}{m'}$$

and hence $$\frac{C}{M} = \frac{C+c+c'}{M+m+m'}$$

and therefore $$\Omega' = \Omega$$

Thus it is seen that measuring the resonant frequency of the composite system consisting of the structure, exciter and pick-off, as indicated by the pick-off, yields a direct measurement of the resonant frequency of the structure considered alone.

It is demonstrable that the remaining characteristics of the composite structure, in particular the damping factor and the amplitude are substantially equal to the corresponding characteristics of the structure alone, to within an error less than about 1%, provided the exciter and pick-off are such that $\Delta F$ and $\Delta F'$ are small relatively to F.

The composite assembly comprising the structure, exciter and pick-off, the latter two components being tuned to the resonant frequency, can be represented by the same equivalent symbols, as indicated on FIG. 6, wherein the respective components have the following values:

$$M+m+m'$$
$$B+b+b'$$
$$C+c+c'$$

FIG. 7 schematically represents both a vibration generator or exciter and a receiver or pick-off according to the invention. In this embodiment, the device comprises a pair of resilient strips 30 and 31 each having one end fixed, respectively at 32 and 33, in a stationary support 34 and carrying between their opposite ends 35 and 36 a vibrating assembly 37 from one side of which a stylus 38 projects. For modifying the resonant frequency of the device, each strip 30 and 31 is clamped between a pair of rollers, respectively 39—40 and 41—42, spring pressed towards each other by springs 43—44 and 45—46 respectively, attached to supports 47, 48 49 and 50 forming part of a sliding assembly 51. This sliding assembly is formed with a threaded opening 52 which co-operates with a threaded rod 53 rotatably mounted in the support 34 while being prevented from axial movement by shoulders 54 and 55, and carrying a knurled operating knob 56 at its end. The strips 30 and 31 at their outer portions (to the left as shown) may be considered as being fixed at the clamped sections 57 and 58 thereof between the rollers. Thus the free length of the strips may be continuously modified and the resonant frequency of the assembly comprising the said outer strip portions 30' and 31' and the vibrating unit 37 may be thereby adjusted. An index 59 secured to the sliding assembly indicates the resonant frequency on a scale 60.

The strips 30 and 31, preferably formed from the substance glucinium(beryllium)bronze known as chrysocal, each have the configuration shown in plan in FIG. 8. As shown, a cutout 61 formed at the end 35 remote from the fixed end 32 defines a tongue 62 having its root near the end 35.

By this configuration, which is known per se, it is possible to impart a substantially translatory movement to the vibratory element 37, that is, the path of said element will only have a very small lateral component along the longitudinal dimension of the strips. The aperture 63 near the end 64 of the tongue 62 serves to pass the rod 65 carrying the vibratory element 37 the rod being rigidly connected with the tongue. The unit 37 is composed of the member 65 and the casing 68 carrying the winding 69 in the case of an exciter, and the magnet 76 in the case of a pick-off.

In the form of embodiment shown in FIG. 9, the strip 30 is fixed at both ends 32 and 35, the support 34 serving to fix the end 32 being extended for fixing the end 35, and the tongue 65' is defined by a cutout 66 extending from the end 35 of the strip, while the free end 67 of the tongue 65' is directed towards the same end 35 of the strip.

The feeler and remaining movable components of the vibrating assembly are desirably made from a lightweight alloy such as magnesium alloy elektron.

FIG. 10 illustrates in greater detail one possible construction of the moving or vibrating assembly of an exciter according to the invention. Secured to the rod 65 is the casing 68 of a winding 69 connected at 70 to a supply circuit 71 and arranged for displacement within the circular airgap 72 of a magnet 73.

FIG. 11 illustrates in similar detail one construction of the moving or vibrating assembly of a vibration pick-off according to the invention. A pair of aligned rods 74 and 75 made of a lightweight alloy or the like support between them a permanent magnet 76 which may desirably be formed from the substance known as "Ferroxdure" or other substance having equal impact strength and resistance to demagnetizing fields. The magnet 76 is positioned between a dual winding 77 comprising the two coils 78 and 79 electrically connected in series opposed relation as shown in FIG. 12, i.e. with the inner end 80 of winding 78 connected to one output terminal 81 and the outer end 82 of the winding connected by a lead 83 with the inner end 84 of the other winding 79 the outer end 85 of which is connected to the other output terminal 86. The windings 78 and 79 are wound in a common sense, so that the currents induced therein on displacement of the magnetic core 76 in the direction of the arrow will flow respectively as shown by the arrows $f_1$ and $f_2$, while any currents induced by stray fields would flow as indicated by the arrows $f_1'$ and $f_2'$. Thus the E.M.F.'s generated in the windings by displacement of the magnet 76 will aid each other, while any E.M.F.'s generated in the windings by stray fields would cancel each other.

The dual winding is desirably protected by a mild steel shielding 87. The impedance of the device may be matched to that of any desired indicating or measuring instrument. Its sensitivity is found to be sufficient not to require the use of any amplifying means.

We claim:
1. Method of determining a resonant frequency of a structure, comprising causing the structure to vibrate at a variable frequency by means of a vibrator having an adjustable resonant frequency and fed by an electric current of variable frequency, picking off the amplitude of the vibrations of a point of said structure by means of a pick-off having an adjustable resonant frequency, adjusting the resonant frequency of the vibrator and the resonant frequency of the pick-off to the frequency value of the current for which a maximum amplitude of vibrations is picked off by the pick-off during said vibrating, causing the frequency of the current to vary in the vicinity of the value of said adjusting frequency, again picking off the maximum amplitude of the vibrations picked off by the pick-off during said variation, and adjusting the frequencies of the vibrator and the pick-off to the frequency value of the current for said second mentioned maximum.

2. Method of determining a resonant frequency of a structure, comprising causing said structure to vibrate by means of an electrodynamic exciter having an adjustable resonant frequency and fed from an electric current of variable frequency, picking off, by means of a pick-off with adjustable resonant frequency, the amplitude of vibrations of the structure, adjusting the resonant frequency of the exciter and the resonant frequency of the pick-off to the frequency of the maximum of the amplitudes thus picked-off, renewing vibration by causing the frequency of the electric current to vary about said adjusted frequency value, and picking off, by means of the pick-off, the amplitude of vibrations of the structure, the frequency of the maximum of the latter amplitudes being a sufficiently close approximation of the desired resonant frequency value of the structure.

3. A method of investigating the behavior of a structure, fixed on a stationary support, under vibratory conditions comprising first determining a resonant frequency of said structure by causing the structure to vibrate at a variable frequency by means of a vibrator having an adjustable resonant frequency and fed by an electric current of variable frequency, picking off the amplitude of the vibrations of a point of said structure by means of a pick-off having an adjustable resonant frequency, adjusting the resonant frequency of the vibrator and the resonant frequency of the pick-off to the frequency value of the current for which a maximum amplitude of vibrations is picked off by the pick-off during said vibration, causing the frequency of the current to vary in the vicinity of the value of said adjusting frequency, and again picking off by said pick-off the amplitude of the vibrations to which the structure is subjected during said variation, and adjusting the frequencies of the vibrator and the pick-off to the new frequency value of the current for which the amplitude of the vibrations to which the structure is subjected is a maximum, causing said structure to vibrate by means of the vibrator adjusted in said manner, and picking off the motions of different points of said structure thus vibrating by means of the pick-off thus adjusted.

4. For the purpose of investigating the behavior of a structure under vibratory conditions, a system comprising a vibrator acting by mechanical contact, first resilient means urging the vibrator against the structure, a mechanical contact pick-off, second resilient means urging the pick-off against the structure, means for adjusting the resonant frequency of the vibrator, and means for adjusting the resonant frequency of the pick-off independently of the resonant frequency of the vibrator.

5. For the purpose of investigating the behavior of a structure attached to a support under vibratory conditions: an electromagnetic vibrator comprising an exciter in substantially pinpoint mechanical contact with the structure, first resilient means bearing against said support and urging said exciter in contact with the structure, means for feeding alternating electric current to said vibrator, means for causing the frequency of said feed current to vary, a vibration pick-off comprising a feeler member having mechanical contact with the structure, second resilient means bearing against said support and urging said feeler member in contact with said structure means for causing the natural frequency of said vibrator to vary, and means for causing the natural frequency of said pick-off to vary.

6. In a method of investigating a structure under vibratory conditions by means of a vibrator having a substantially pinpoint physical contact with said structure and by means of a vibration pick-off having an almost pinpoint physical contact with said structure, said structure having an unknown resonant frequency, the preliminary measure of causing the structure to vibrate substantially at one of its resonant frequencies, and which comprises: supplying the vibrator with an alternating current of variable frequency and causing said frequency to vary until the pick-off discloses a maximum vibration amplitude for the point of said structure in contact therewith, adjusting the resonant frequency of said vibrator and of said pick-off to the frequency corresponding to this maximum vibration amplitude, causing the feed frequency of the current to vary in the vicinity of the frequency thus picked off until said pick-off discloses a second maximum amplitude value of vibrations of said contact point of the structure, adjusting the natural frequency of said vibrator and of said pick-off to the frequency corresponding to this second maximum vibration amplitude, repeating said process of varying the feed frequency and picking-off the maximum amplitude value until the frequency of a maximum amplitude value differs from the frequency of the maximum amplitude value of the previous steps by less than a predetermined amount, and leaving the natural frequency values of said vibrator and of said pick-off equal to said last picked-off value and supplying the vibrator with current at the last picked off frequency.

7. A vibration generator designed to cooperate with a structure fixed to a support for investigating the behavior of the latter under vibratory conditions, comprising a base integral with the support, a pressure member adapted to be brought into contact with said structure for the purpose of causing it to vibrate, resilient means bearing against said base and urging said member into contact with said structure, control means to vary the natural frequency of said member and said resilient means, electro-magnetic means to set said member in alternating motion, and further means to vary the frequency of current with which said electro-magnetic means is fed, said control means and said further means being actuated by a single actuating member.

8. Device for investigating a vibrating structure fixed to a support comprising a base and an integral support, an assembly mounted so as to be capable of making a reciprocating motion transverse to said structure and in response to the vibration thereof and comprising a permanent magnet and an end adapted to be brought into contact with said structure, spring means coupled to said assembly to urge said end in contact with said structure, means for adjusting the tension of said spring means, winding means cooperating with said permanent magnet of said assembly, said winding means comprising two windings in alignment with the axis of said magnet in side by side relationship alongside of said magnet and including turns of the same direction, said two windings being in series opposed with the outer end of one of said windings being coupled to the inner end of the other of said windings, and electrical connection members for conducting current generated in said winding means.

9. An exciter for causing a structure to vibrate, comprising a stationary support, two parallel resilient members each having one end fixed to said support, an exciting stylus transverse to said resilient members and fixed thereon at a region remote from said stationary support, means for electro-dynamically urging said finger periodically in its longitudinal direction, and means on said support for gripping said resilient members in a region located between the fixing region of the stylus and said stationary support to establish the effective length of said resilient members, said gripping means being slidable along the lengths of the resilient members to vary the effective lengths thereof.

10. An exciter according to claim 9, wherein said other ends of said resilient members are also fixed to said stationary support.

11. A vibrator for exciting a structure, comprising an exciting stylus, electro-dynamic means for periodically urging the stylus in its longitudinal direction, a support, an elastic strip fixed at its two ends on said support, said strip being provided with a cut-out adjacent one of the fixed ends thereof, a tongue on said strip in said cut-out, said stylus being fixed on said tongue, two parallel rollers on said support transverse to said strip and clamping the same therebetween, means for displacing said rollers between said tongue and the other of said fixed ends, said rollers varying the effective length of said strip.

12. A vibrator for mechanically exciting a structure comprising a stationary support, an exciting stylus, electrodynamic means for periodically urging the stylus along its length, a strip member transverse to said stylus, said strip member having one end thereof fixed to said stationary support and being provided with a U-shaped cut-out at its other end, a tongue on said strip member in said cut-out, said stylus being fixed to said tongue, means on said support for gripping said strip, and means for displacing said gripping means along said strip between said tongue and said fixed end to vary the effective length of said strip.

13. A pick-off for investigating a structure which has been caused to vibrate, comprising a pick-off stylus, electromagnetic means translating longitudinal displacements of said stylus into an electric current, a rigid frame, elastic strip means on said frame supporting said stylus at a position spaced from said rigid frame, means on said frame for varying the effective length of said strip means by engaging the same between said frame and stylus.

14. A pick-off for investigating a structure which has been caused to vibrate, comprising a pick-off stylus adapted to be brought into contact with the structure to be investigated, two parallel elastic strips transverse to said stylus and supporting the same, a support structure for said strips, and means to fix said strips relative to said support structure, said fixing means being longitudinally displaceable along the strips to vary the effective length of said strips by engaging the same between said support structure and said stylus.

15. A device for investigating a structure under vibration, comprising a support, a picking-off stylus spaced from said support, elastic means on said support and connected to said stylus and enabling a longitudinal displacement of the stylus, said elastic means being transverse to said longitudinal displacement, and electro-magnetic means operatively coupled with said stylus for generating an electric voltage in response to movements of the stylus.

16. For use in investigating the behavior of a structure with respect to vibrations: an electro-magnetic vibrator comprising a first exciter including a stylus in pinpoint contact with said structure, first resilient means urging said first stylus towards said structure, a second exciter including a stylus in pinpoint contact with said structure, second resilient means urging said second stylus towards said structure, the first and second styluses being in contact with the structure at points substantially aligned on opposite sides of the said structure, means for supplying alternating current to said exciters, means for varying the frequency of said current; a vibration pick-off comprising a stylus cooperating with said structure, third resilient means urging said third stylus towards the structure; and support means for the structure permitting vibration thereof.

17. A method of effecting the investigation of the behavior of a structure under vibratory conditions comprising first determining a resonant frequency of said structure by causing the structure to vibrate at a variable frequency by means of a vibrator having an adjustable resonant frequency and fed by an electric current of variable frequency, picking off the amplitude of the vibrations of a point of said structure by means of a pick-off having an adjustable resonant frequency, adjusting the resonant frequency of the vibrator and the resonant frequency of the pick-off to the frequency value of the current for which a maximum amplitude of vibrations is picked off by the pick-off during said vibration, causing the frequency of the current to vary in the vicinity of the value of said adjusting frequency, and again picking off by said pick-off the amplitude of the vibrations to which the structure is subjected during said variation, and adjusting the frequencies of the vibrator and the pick-off to the new frequency value of the current for which the amplitude of the vibrations to which the structure is subjected is a maximum, the investigation being conducted with the vibrator and the pick-off so adjusted.

18. An exciter according to claim 9 wherein the other ends of said resilient members are free from said stationary support.

References Cited in the file of this patent

UNITED STATES PATENTS

| | | |
|---|---|---|
| 2,249,649 | Fielding | July 15, 1941 |
| 2,272,984 | Ritzmann | Feb. 10, 1942 |
| 2,336,930 | Dyer | Dec. 14, 1943 |
| 2,362,467 | Clark | Nov. 14, 1944 |
| 2,403,999 | Read et al. | July 16, 1946 |
| 2,429,094 | Kent et al. | Oct. 14, 1947 |
| 2,568,586 | Hunt et al. | Sept. 18, 1951 |
| 2,644,331 | Loring | July 7, 1953 |
| 2,663,184 | Merrill et al. | Dec. 22, 1953 |
| 2,932,972 | Cosby et al. | Apr. 19, 1960 |

FOREIGN PATENTS

| | | |
|---|---|---|
| 495,780 | Great Britain | Nov. 18, 1938 |
| 1,083,176 | France | June 23, 1954 |